United States Patent [19]
Brown

[11] Patent Number: 5,805,154
[45] Date of Patent: Sep. 8, 1998

[54] INTEGRATED BROADCAST APPLICATION WITH BROADCAST PORTION HAVING OPTION DISPLAY FOR ACCESS TO ON DEMAND PORTION

[75] Inventor: Ralph W. Brown, Boulder, Colo.

[73] Assignee: Time Warner Entertainment Co. L.P., Stamford, Conn.

[21] Appl. No.: 572,143

[22] Filed: Dec. 14, 1995

[51] Int. Cl.$^6$ ............................. H04N 7/14; H04H 1/02
[52] U.S. Cl. ............................. 345/327; 348/7; 348/12; 348/13; 455/5.1
[58] Field of Search ........................... 348/6, 7, 12, 13, 348/10; 455/3.1, 4.1, 4.2, 5.1, 6.1, 6.2; 395/200.47–200.49; 345/326, 327; H04N 7/10, 7/14, 7/173

[56] References Cited

U.S. PATENT DOCUMENTS

| | | |
|---|---|---|
| 3,956,717 | 5/1976 | Fisher et al. . |
| 4,214,316 | 7/1980 | Lipsky . |
| 4,506,387 | 3/1985 | Walter . |
| 4,530,008 | 7/1985 | McVoy . |
| 4,553,161 | 11/1985 | Citta . |
| 4,592,546 | 6/1986 | Fascenda et al. . |
| 4,823,386 | 4/1989 | Dumbauld et al. . |
| 4,991,208 | 2/1991 | Walker et al. . |
| 5,046,090 | 9/1991 | Walker et al. . |
| 5,093,718 | 3/1992 | Hoarty et al. . |
| 5,168,353 | 12/1992 | Walker et al. . |
| 5,220,420 | 6/1993 | Hoarty et al. . |
| 5,225,267 | 7/1993 | Hansen et al. . |
| 5,311,423 | 5/1994 | Clark . |
| 5,343,239 | 8/1994 | Lappington et al. . |
| 5,357,276 | 10/1994 | Banker et al. . |
| 5,361,091 | 11/1994 | Hoarty et al. . |
| 5,383,112 | 1/1995 | Clark . |
| 5,390,337 | 2/1995 | Jelinek et al. . |
| 5,394,394 | 2/1995 | Crowther et al. . |
| 5,400,402 | 3/1995 | Garfinkle . |

(List continued on next page.)

OTHER PUBLICATIONS

Adams, Michael, "Network Design and Implementation of a large–scale, ATM, Multimedia Network," *Engineer Conference Notes* from NETWORLDsm+ INTEROP® 95, Las Vegas, NV (Mar. 27–31, 1995).

Adams, Michael, "Real Time MPEG Asset Delivery over ATM," *NCTA Technical Papers*, 1995:315–326 (1995).

News Release, "Time Warner Introduces World's First Full Service Network in Orlando," Timewarner Cable Full Service Network, Maitland, FL, 32751 (Dec. 14, 1994).

Product Information Package from Wink Communications, 2061 Challenger Drive, Alameda, CA 94501 (1995).

Request for Proposals, "Development of a Full Service Network: A request by Time Warner for assistance in building a full service telecommunications network" (Feb. 11, 1993), Time Warner Cable, Denver, CO.

Vecchi, Mario P., and Adams, Michael, "Traffic Management for Highly Interactive Transactional System," *NCTA Technical Papers*, 1995:258–266 (1995).

*Primary Examiner*—Mark R. Powell
*Assistant Examiner*—John W. Miller
*Attorney, Agent, or Firm*—Homer L. Knearl; Holland & Hart llp

[57] ABSTRACT

An interactive integrated application, having a broadcast portion and an on-demand portion, is provided to a user station via a communication network. The broadcast portion of the application is broadcast over a first channel to a plurality of user stations from an application source. The broadcast portion has an interactive option embedded in it. This interactive option is displayed with the broadcast portion at a user station to provide a viewer at the user station an option to request the on-demand portion of the application. When the viewer at the user station selects the option displayed with the broadcast portion, the user station exercises the option and requests the on-demand portion of the application. An interactive communication session is established between the on-demand portion of the integrated application and the user station exercising the interactive option in the broadcast portion.

13 Claims, 6 Drawing Sheets

U.S. PATENT DOCUMENTS

| | | |
|---|---|---|
| 5,412,720 | 5/1995 | Hoarty . |
| 5,421,031 | 5/1995 | De Bey . |
| 5,422,674 | 6/1995 | Hooper et al. . |
| 5,423,555 | 6/1995 | Kidrin . |
| 5,425,027 | 6/1995 | Baran . |
| 5,426,699 | 6/1995 | Wunderlich et al. . |
| 5,442,700 | 8/1995 | Snell et al. . |
| 5,446,726 | 8/1995 | Rostoker et al. . |
| 5,452,297 | 9/1995 | Hiller et al. . |
| 5,453,979 | 9/1995 | Schibler et al. . |
| 5,455,701 | 10/1995 | Eng et al. . |
| 5,455,820 | 10/1995 | Yamada . |
| 5,455,825 | 10/1995 | Lauer et al. . |
| 5,459,722 | 10/1995 | Sherif . |

INTEGRATED BROADCAST APPLICATION WITH BROADCAST PORTION HAVING OPTION DISPLAY FOR ACCESS TO ON DEMAND PORTION

BACKGROUND OF THE INVENTION

1. Field of the Invention

This invention relates generally to interactive multimedia communication networks. In particular, the invention relates to an interactive multimedia communication network providing an application (or applications) containing both broadcast and on-demand features. The invention also encompasses the application itself and a method for providing the application to a user on the network.

2. Background Art

Prior art communication networks provide analog and digital information to users via user stations attached to the network. For example, standard Community Access Television (CATV) networks broadcast analog television signals (video and audio) to users on discrete channels via coaxial cable (or a combination of fiber optic cable and coaxial cable) connected to converters within, or connected to, the users' televisions. By "broadcast" we mean the simultaneous transmission of an identical information stream to a plurality of users. Other networks broadcast digital video and audio signals to users via microwave satellite transmission directly to a receiving dish connected to the user's television. In both analog and digital broadcast transmission, the information flow is one-way: from the programming source to the users.

It is also possible to provide for interactive communication between a user and a central location within a communication network. By "interactive" we mean two-way communication between an application source and a user within a communication session. By "communication session" we mean a dialog between two devices. Examples of interactive television systems may be found in Hoarty U.S. Pat. No. 5,412,720 and Hoarty et al. U.S. Pat. No. 5,361,091, the disclosures of which are incorporated herein by reference.

In true interactive television applications, a user must establish a communication session with the application through the network controller at the dead end (or other node) via a dedicated channel. By "channel" we mean a dedicated path that transfers information across a network. All communication between the network controller and the user within the interactive application takes place on this dedicated channel. The use of a dedicated channel enables the information exchanged during each user's communication session to be unique, even if multiple user's are accessing the same interactive application on the network. The communication network has a limited number of interactive channels, however, which limits the number of users who can concurrently access interactive services on the network.

There have been attempts to provide a kind of "pseudo-interactivity" for applications residing within broadcast programming. For example, Lappington U.S. Pat. No. 5,343,239 describes a television system in which game information is inserted into the vertical blanking interval ("VBI") of a standard television broadcast. This game information is received and decoded by a user's settop box, then transmitted via an IR link to a handheld game device. The game device translates the information it receives into questions and/or game options for the user. The user responds to the questions by pressing keys on the handheld device, and the handheld device processes the answers to display a score at the end of the event or game. The user may then transmit his or her displayed score to a central processing station by using a touch-tone telephone. This system is not truly interactive, as that term is defined here.

As another example of "pseudo-interactivity," Kidrin U.S. Pat. No. 5,423,555 describes a video game system in which video game information (such as data and commands for the user's game cartridge) is broadcast to users over the VBI of a standard television signal. The user's game cartridge uses this information to permit the user to "interact" with the game appearing on his or her television set. The user does not send information back to a central location within a communication session; the Kidrin system is therefore not interactive within the meaning of that term here.

The disclosures of the Lappington and Kidrin patents are incorporated herein by reference.

SUMMARY OF THE INVENTION

What is needed is a way to provide a truly interactive application in a manner that conserves network resources. This invention is a method and system that meet this need.

In one embodiment, the invention provides a method for providing an interactive application to a user station via a communication network, the method comprising the following steps: broadcasting a broadcast portion of the application to a plurality of user stations from an application source via a first channel on the communication network, the broadcast portion including an option for a user station to request an interactive portion of the application; establishing via a second channel an interactive communication session between the application source and one user station in response to the one user station's request; and transmitting information between the application source and the one user station interactively within the communication session.

In another embodiment, the invention provides a communication system comprising: a source of an integrated broadcast and on-demand application, the application comprising a broadcast portion and an on-demand portion; a communication network communicating with the source, the network comprising a network controller; and a plurality of user stations in communication with the communication network through the network controller.

The invention is described in more detail below with reference to the drawings.

DETAILED DESCRIPTION OF THE PREFERRED EMBODIMENTS

In general terms, the invention is a method of providing an interactive, on-demand application on a communication network. The application is divided into at least two portions, a broadcast portion and an on-demand portion. The broadcast portion of the application is sent to multiple users simultaneously via a broadcast channel on the network. Included with the broadcast portion of the application is an option for a user to establish an interactive communication session via the on-demand portion of the application. Exercise of the option establishes the communication session between the user and the network controller within the on-demand portion of the application. This transfer to an interactive session is seamless. Because the broadcast and on-demand operations are two parts of the same integrated application, the user is blind to the change from broadcast mode to interactive mode.

The broadcast portion of the application may be sent to users via an analog broadcast or via a digital broadcast. If sent via an analog channel, the broadcast portion may be sent in the vertical blanking interval (VBI) of the broadcast transmission. If sent via a digital channel, the broadcast portion may be included in the private data portion of an MPEG transmission.

Figure 1:
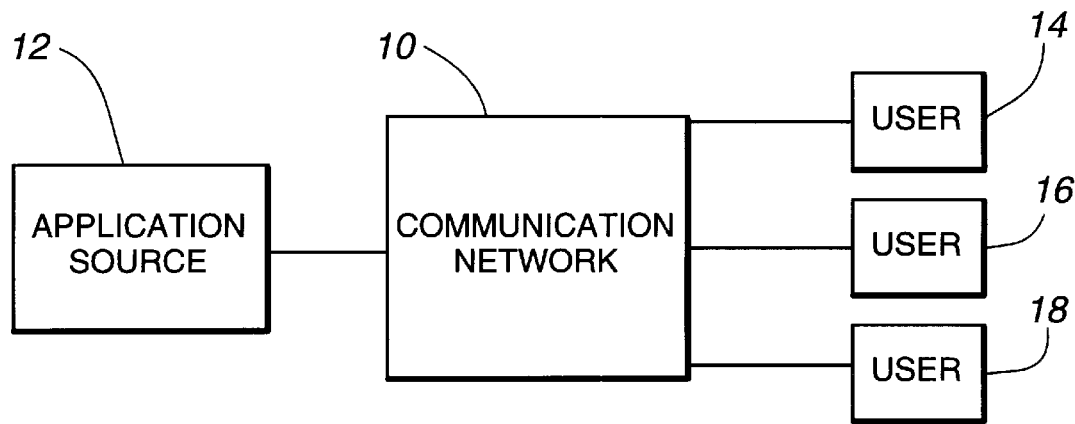
FIG. 1 is a schematic block diagram of a communication network providing two-part broadcast/on-demand applications.

A general block diagram of a communication network providing two-part broadcast/on-demand applications is shown in FIG. 1. The network 10 is the interface between an application source 12 and a plurality of users 14–18. Network 10 can be any communication network known in the art, such as a cable network, a telephone network, or any other network providing broadcast and on-demand services to a plurality of users. Network 10 includes all controls and information carriers necessary to provide broadcast and interactive information streams to the users. Application source 12 can be a digital storage medium, an analog storage medium, or a combination of both, and may include other programming, such as standard television programming and digital video-on-demand. Application source 12 may be physically proximate network 10 or it may communicate with network 10 from a distant location via RF transmission (e.g., satellite communication) or any other suitable means.

Figure 2:
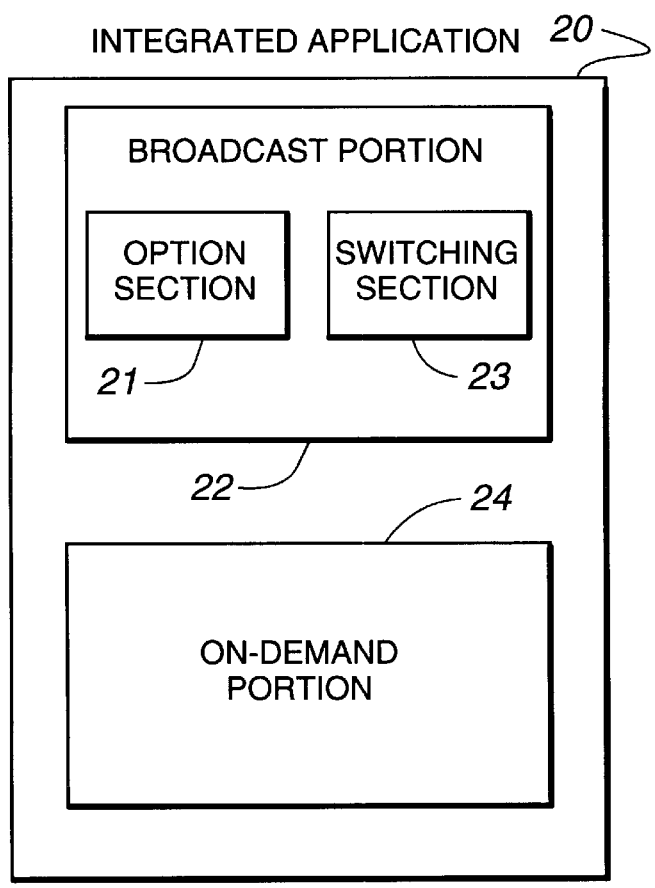
FIG. 2 is a schematic block diagram of a two-part application according to this invention.

Application source 12 contains at least one two-part application 20, as shown in FIG. 2. Application 20 has a broadcast portion 22, which is designed to be transmitted simultaneously to a plurality of users, and an on-demand portion 24, which is designed to interact with a particular user within an established communication session. Portions 22 and 24 are logically associated with each other to form application 20 and are not necessarily physically proximate within application source 12. In fact, broadcast portion 22 and on-demand portion 24 may come from physically separate sources within application source 12. In addition, application source 12 is itself only a logical grouping of integrated broadcast and on-demand applications. The broadcast portion and on-demand portion of a particular integrated application may come from different locations entirely. What is important is that the two portions of any particular integrated application operate together to form a logical whole providing the interactive features desired in the application through a combination of broadcast and on-demand modes, preferably in a manner that cannot be detected by a user.

Broadcast portion 22 of application 12 preferably includes at least two elements: an option section 21 that presents an option for a user to switch to the on-demand portion of the application and a switching section 23 enabling the user to switch to the on-demand portion of the application if the option is selected. As discussed in more detail below, in a preferred embodiment, option section 21 is a video transmission (either analog or digital) presenting the user with an option to establish an interactive session, and switching section 23 is software code enabling the user to establish an interactive session on another channel to receive the on-demand portion of the application.

Figure 3:
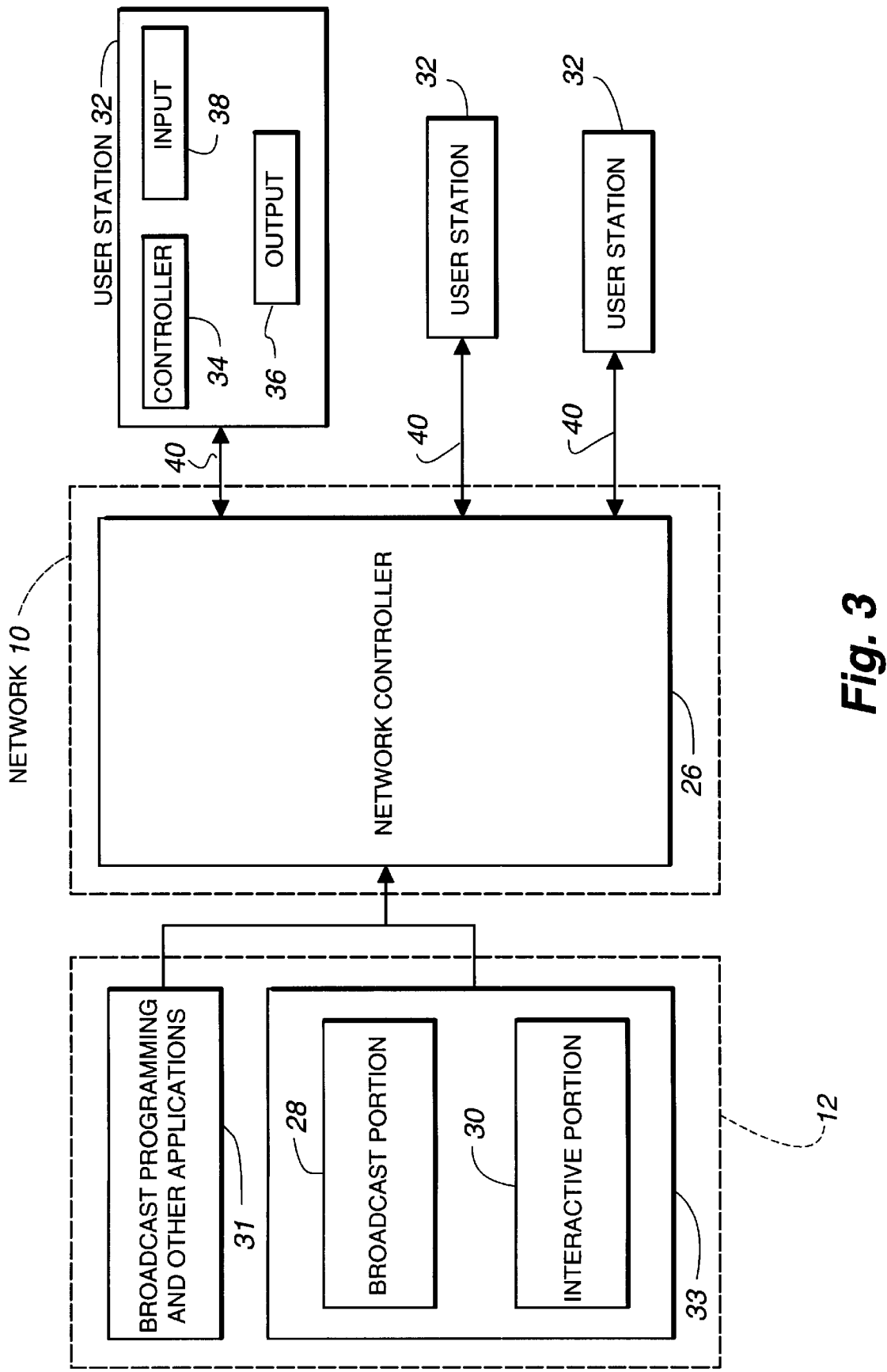
FIG. 3 is a block diagram showing elements of the invention in more detail.

FIG. 3 is a block diagram showing elements of the invention in more detail. Network 10 includes a network controller 26 communicating with an application source 12 and the users. In the embodiment shown in FIG. 3, application source 12 contains at least one broadcast information source 28, at least one on-demand information source 30, and a source 31 of broadcast and other programming, each communicating with network controller 26. Broadcast information source 28 and on-demand information source 30 cooperate to provide the integrated broadcast and on-demand application of this invention.

Each user is represented by a user station 32. Each user station 32 contains a controller 34 for interfacing with the network, an output 36 (such as a television) for displaying information to the user, and an input 38 (such as an IR link from a hand-held controller) for receiving information from the user (such as the selection of an option that will switch an application from a broadcast portion to an on-demand portion.) The user station controller may have associated memory (not shown) for receiving software from the broadcast portion of an integrated broadcast/on-demand application that will enable the controller to switch to the on-demand portion of an integrated application when requested by a user.

Information streams move between the user stations 32 and the network on information carriers 40 in the block diagram of FIG. 3. These information carriers may be telephone lines, coaxial cable, fiber optic cable, RF communication links, or any other communication mode or combination of modes known in the art. In addition, while a single line is shown in FIG. 3 between each user station and the network, it should be understood that this single line is only a schematic representation. There may be multiple physical communication links between each user station and the network.

Figure 4:
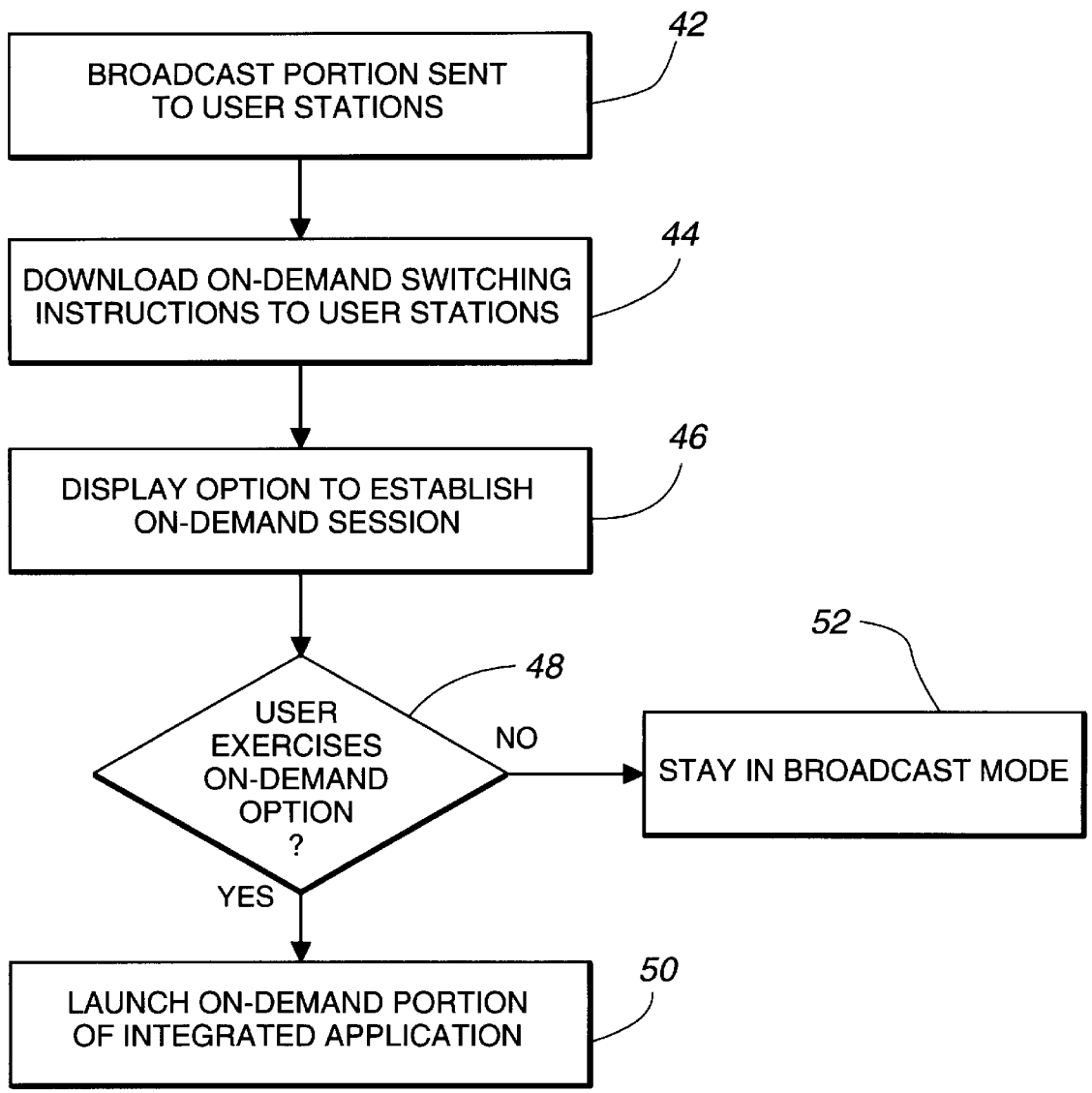
FIG. 4 is a flow chart illustrating a method according to a preferred embodiment of this invention.

FIG. 4 is a flow chart illustrating the method of a preferred embodiment of this invention. As shown in step 42, the communication network broadcasts the broadcast portion of an application over a first forward communication channel from the application source to a plurality of user stations, either in response to request from the users (such as by tuning into a particular channel or by selecting a particular service), on a schedule, or at the request of a network operator. In the preferred embodiment, the broadcast portion is preferably included in the VBI of an analog transmission or in the private data portion of a digital MPEG transmission. Alternatively, the broadcast portion may be sent as a stand-alone transmission.

In addition to downloading into the user station instructions needed to launch an interactive on-demand portion of the application (step 44), the broadcast application will preferably provide users with a display of at least one option to launch an interactive portion of the application (step 46). A user may then exercise the option in the required manner (step 48), such as by selecting a choice listed on the user's television screen by the broadcast portion of the application via a remote control unit and thereby sending a selection signal back to the application source via a return channel. In response, the network establishes a communication session over a second forward communication channel by launching the on-demand portion of the application (step 50). Otherwise, the broadcast portion of the application continues to run until complete.

The process may repeat within a single application. In other words, the broadcast portion of a single application may present multiple opportunities for a user to launch an on-demand portion of the application, i.e., to establish an interactive communication session between the user and the network. In addition, an application may return to a broadcast portion of an application upon completion of an on-demand portion of an application.

The broadcast portion of the application may be sent to the plurality of user stations via the VBI portion of a standard television broadcast channel in a manner known in the art. Thus, while the broadcast portion of the application may be included within standard television programming, it will be received and interpreted only by the user stations having suitable hardware and software. The broadcast portion may also be sent out via other means, such as in the private data field of a broadcast digital MPEG compressed video signal.

Figure 5:
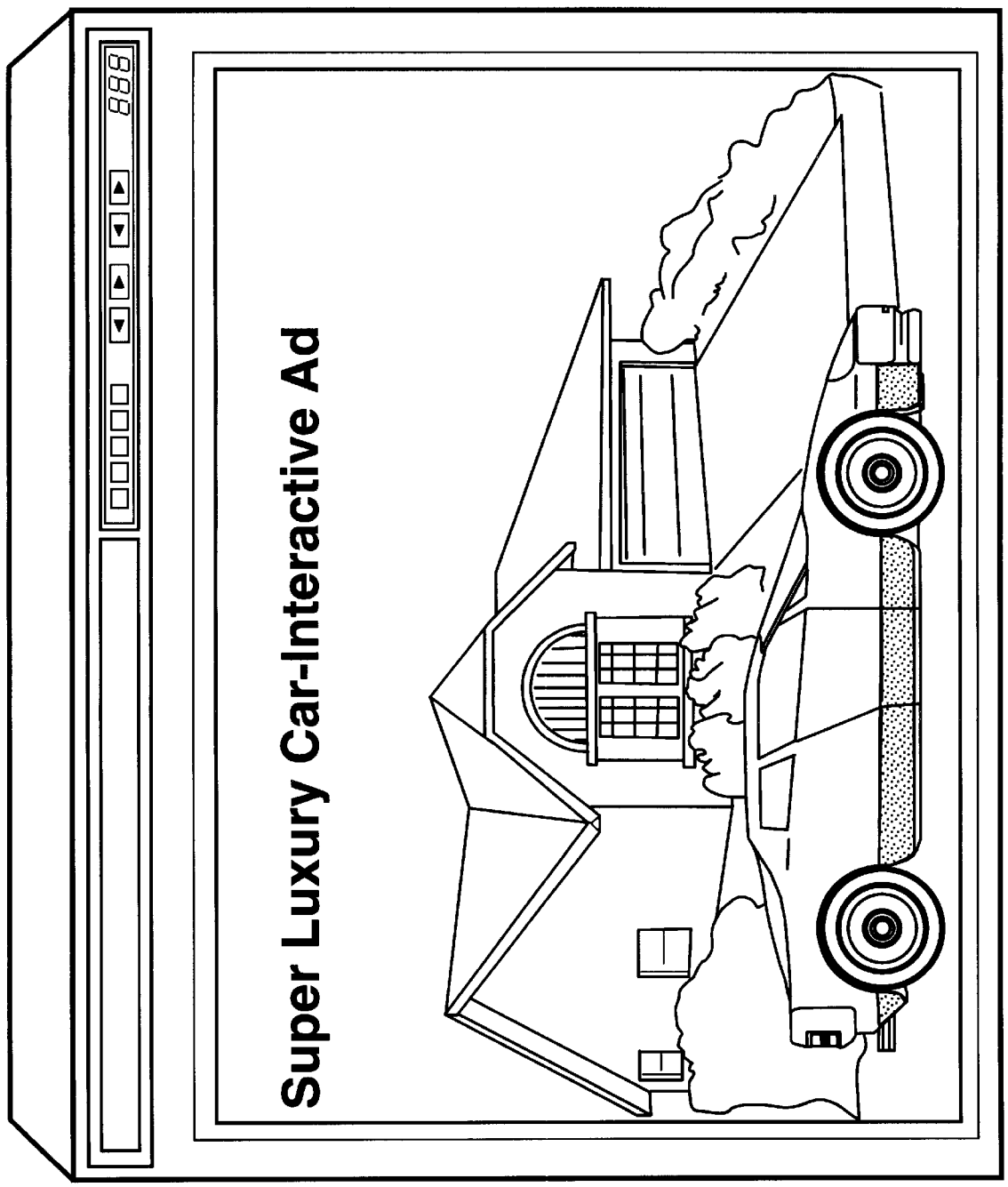
FIG. 5 illustrates a display seen by a user as part of a two-part broadcast/on-demand application according to this invention.
Figure 6:
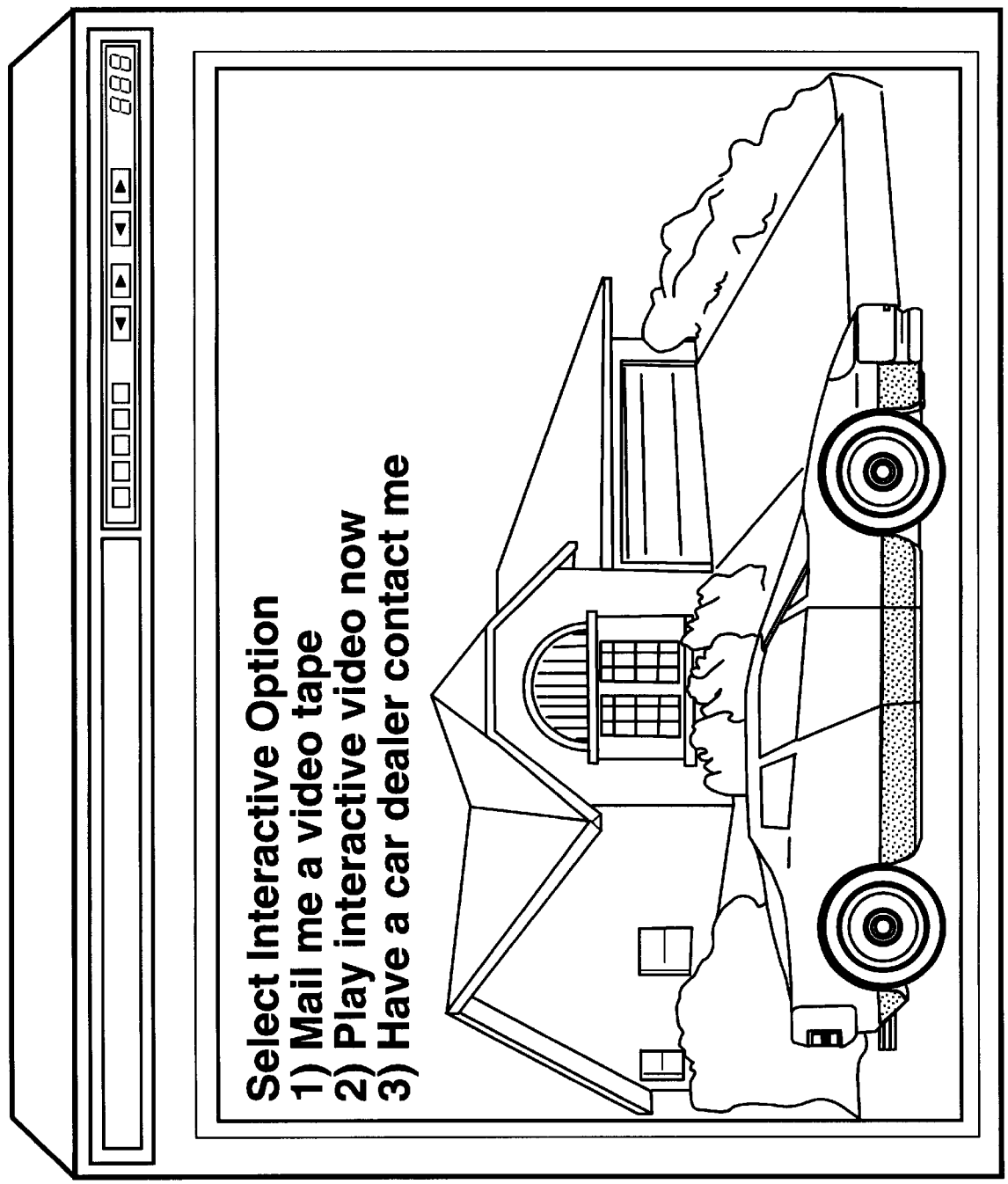
FIG. 6 illustrates a second display seen by a user as part of the two-part application described with reference to FIG. 5.
Figure 7:
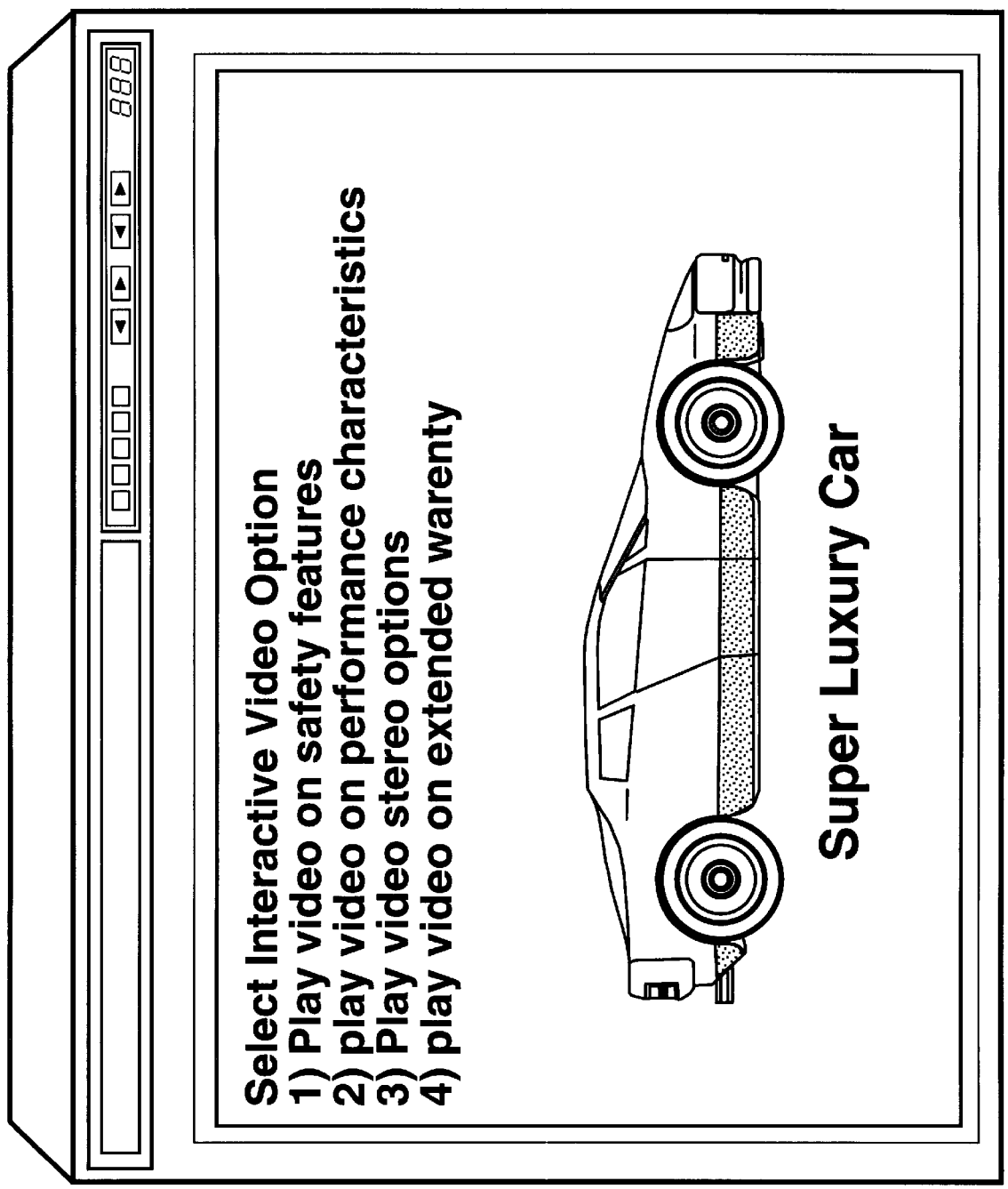
FIG. 7 illustrates a third display seen by a user as part of the two-part application described with reference to FIGS. 5 and 6.

The invention can be illustrated by some examples. In a first example, the network broadcasts an automobile advertisement over an analog broadcast channel to all users who have selected that channel for viewing, as shown in FIG. 5. Inserted in the VBI of the advertisement is information giving the user an option to obtain further information about the automobile. This information includes a message for display on the user's television monitor as well as software code that will enable the user station controller to comply with the user's selection of the option. Using the input of his or her user station, the user can exercise the option by sending a signal to the network controller via the return control channel associated with the user station. This return signal launches the on-demand portion of the application, which establishes a communication session with the user on a digital communication channel by downloading information to provide, e.g., a video giving more detailed information regarding a particular automobile and possibly further options for obtaining more information in an interactive manner, as shown in FIGS. 6 and 7.

In another example, during broadcast of a television program guide or a movie guide (such as promotional pieces for the television programs or movies), a broadcast portion of an application is downloaded to the user stations through the VBI. Contained in this broadcast portion is the code for (1) displaying a choice for the user to move to an on-demand application (such as a movie review, a longer promotional piece, or the movie itself) and (2) launching the selected on-demand portion in response to a selection by a user.

A user station design for receiving integrated broadcast/on-demand applications is described in copending U.S. patent application titled "A Method and Apparatus for Enticing a Passive Television Viewer By Automatically Playing Promotional Presentations of Selectable Options in Response to the Viewer's Inactivity" which was filed concurrently with this application and which is incorporated herein by reference.

A preferred network for providing integrated broadcast/on-demand applications is described in a U.S. patent application filed concurrently with this application titled "A Method for Message Addressing in a Full Service Network." The disclosure of that patent application is incorporated herein by reference.

Modifications to the invention described above will be apparent to those skilled in the art. All such modifications which do not depart from the spirit and scope of the invention are deemed to be covered by the invention which is limited only by the claims which follow.

What is claimed is:

1. A method for providing an interactive integrated application, having a broadcast portion and an on-demand portion, to a user station via a communication network, the method comprising the following steps:

broadcasting the broadcast portion of the application to a plurality of user stations from an application source via a first channel on the communication network, the broadcast portion having an interactive option embedded in the broadcast portion, said option for display with the broadcast portion at a user station to provide the user station an option to request the on-demand portion of the application;

displaying at the user station the interactive option along with the broadcast portion:

establishing via a second channel an interactive communication session between the on-demand portion of the integrated application and a user station in response to the user station exercising the interactive option in the broadcast portion; and transmitting information between the application source and the user station interactively within the communication session.

2. The method of claim 1 wherein the broadcasting step broadcasts the broadcast portion via a first network channel, and the establishing step broadcasts the on-demand portion via a second network channel.

3. The method of claim 2 wherein the broadcasting step comprises broadcasting analog information via the first network channel and the interactive option is embedded in a display blanking interval.

4. The method of claim 2 wherein the establishing step further comprises the step of transmitting a request from the user station via a third channel.

5. The method of claim 1 further comprises the step of:

downloading to the user station switching instructions with the broadcast portion, said switching instructions identifying the second channel to the user station.

6. Apparatus for delivering a broadcast application across a communication network from a source to a user station; said broadcast application having a broadcast portion and an on-demand portion, the broadcast portion having an option to be displayed with the broadcast portion, said apparatus comprising:

a network controller for broadcasting the broadcast portion to a plurality of user stations over a broadcast channel;

a user station responsive to the option in the broadcast portion for displaying the option with the broadcast portion;

said user station in response to the option sending a request to the network controller for the on-demand portion of the integrated application; and said network controller launching the on-demand portion of the integrated application to the user station over an on-demand channel separate from the broadcast channel.

7. The apparatus of claim 6 and in addition:

said broadcast portion includes switching instructions for the user station; and said user station responsive to the switching instructions to receive the on-demand application over the on-demand channel when the user station requests the on-demand portion of the integrated application.

8. The apparatus of claim 6 and in addition:

said option is an interactive option providing a viewer at the user station with the option of selecting the on-demand portion of the application while the broadcast portion of the application is being displayed.

9. The apparatus of claim 8 and in addition:

said user station in response to selection of the option by the viewer sends the request for the on-demand portion of the application to the network controller.

10. The apparatus of claim 9 wherein the on-demand portion has embedded therein further options whereby the viewer is provided with further interactive displays through the on-demand portion of the application.

11. The apparatus of claim 10 wherein the integrated application is an advertisement for broadcast to a television set at the user station.

12. The apparatus of claim 11 wherein:

the broadcast portion of the integrated application is the advertisement and the advertisement without option is viewable at user stations not capable of displaying option; and the option in the broadcast portion and the on-demand portion provide additional advertisement information selectable by the viewer at user stations capable of displaying the option and switching to the on-demand portion of the application.

13. A computer program for executing a computer process, said computer program being storage medium readable by a computing system and encoding a program of instructions for providing an interactive integrated application, having a broadcast portion and an on-demand portion, to a user station via a communication network, said computer process comprising the steps of:

broadcasting the broadcast portion of the application to a plurality of user stations from an application source via a first channel on the communication network, the broadcast portion having an interactive option embedded in the broadcast portion, said option for display with the broadcast portion at a user station to provide the user station an option to request an interactive on-demand portion of the application;

displaying at the user station the broadcast portion and the interactive option; and establishing via a second channel an interactive communication session between the on-demand portion of the integrated application and a user station in response to the user station exercising the interactive option in the broadcast portion.

\* \* \* \* \*